US009528686B2

(12) United States Patent
Lub et al.

(10) Patent No.: US 9,528,686 B2
(45) Date of Patent: Dec. 27, 2016

(54) LIGHT-EMITTING ARRANGEMENT WITH ORGANIC PHOSPHOR

(71) Applicant: KONINKLIJKE PHILIPS N.V., Eindhoven (NL)

(72) Inventors: Johan Lub, Eindhoven (NL); Rifat Ata Mustafa Hikmet, Eindhoven (NL); Rene Theodorus Wegh, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/065,747

(22) Filed: Mar. 9, 2016

(65) Prior Publication Data

US 2016/0186961 A1 Jun. 30, 2016

Related U.S. Application Data

(62) Division of application No. 13/825,701, filed as application No. PCT/IB2011/054134 on Sep. 21, 2011, now Pat. No. 9,310,050.

(30) Foreign Application Priority Data

Sep. 28, 2010 (EP) ..................................... 10181066

(51) Int. Cl.

| C08G 73/06 | (2006.01) |
|---|---|
| F21V 9/16 | (2006.01) |
| C08G 63/181 | (2006.01) |
| C08G 63/187 | (2006.01) |
| C08G 63/199 | (2006.01) |

(Continued)

(52) U.S. Cl.
CPC ............... *F21V 9/16* (2013.01); *C08G 63/181* (2013.01); *C08G 63/187* (2013.01);
(Continued)

(58) Field of Classification Search
CPC ............... C09K 2211/14; C09K 2211/1466; C09K 2211/1018; C09K 11/08; H05B 33/14; F21V 9/16; H01L 51/00; H01L 51/0053
(Continued)

(56) References Cited

U.S. PATENT DOCUMENTS

| 6,537,679 B1 | 3/2003 | Buoni |
| 7,615,795 B2 | 11/2009 | Baretz |

(Continued)

FOREIGN PATENT DOCUMENTS

| CN | 1795566 A | 6/2006 |
| CN | 101546812 A | 9/2009 |

(Continued)

OTHER PUBLICATIONS

Lee, et al., "Synthesis and Properties of Violet Light-Emitting Polymeric Fluorophore", Dyes and Pigments, Elsevier Applied Science Publ., Barking, GB, vol. 52, No. 1, Jan. 1, 2002, pp. 37-45, XP004329594.

*Primary Examiner* — Shane Fang

(57) ABSTRACT

The invention provides a light-emitting arrangement (100) comprising a light source (105) adapted to emit light of a first wavelength, and a wavelength converting member (106) arranged to receive light of said first wavelength and adapted to convert at least part of the light of said first wavelength to light of a second wavelength, said wavelength converting member comprising i) a carrier polymeric material comprising a polyester backbone comprising an aromatic moiety, and ii) at least one wavelength converting material of a specified general formula. The perylene derived compounds have been found to have excellent stability when incorporated into said matrix material.

6 Claims, 1 Drawing Sheet

(51) Int. Cl.
  *C09K 11/06* (2006.01)
  *H05B 33/14* (2006.01)
  *H05B 33/20* (2006.01)
  *F21Y 101/00* (2016.01)

(52) U.S. Cl.
  CPC ............ *C08G 63/199* (2013.01); *C09K 11/06* (2013.01); *F21K 9/64* (2016.08); *H05B 33/14* (2013.01); *H05B 33/20* (2013.01); *C09K 2211/1011* (2013.01); *C09K 2211/1044* (2013.01); *F21Y 2101/00* (2013.01)

(58) Field of Classification Search
  USPC .................................. 528/423; 362/293, 351
  See application file for complete search history.

(56) References Cited

U.S. PATENT DOCUMENTS

| | | |
|---|---|---|
| 7,638,943 B1 | 12/2009 | Wedding |
| 2003/0091862 A1 | 5/2003 | Tokito et al. |
| 2003/0111649 A1 | 6/2003 | Park |
| 2007/0273274 A1 | 11/2007 | Horiuchi |
| 2008/0185558 A1 | 8/2008 | Hein |
| 2009/0243469 A1 | 10/2009 | Horiba et al. |
| 2010/0033947 A1 | 2/2010 | Lin et al. |

FOREIGN PATENT DOCUMENTS

| | | |
|---|---|---|
| EP | 227980 A2 | 7/1987 |
| EP | 1641048 A1 | 3/2006 |
| EP | 1641049 A1 | 3/2008 |
| JP | 62148571 A | 7/1987 |
| JP | 4053894 A | 8/1992 |
| JP | 2000230172 A | 8/2000 |
| JP | 2004352928 A | 12/2004 |
| JP | 2004356358 A | 12/2004 |
| JP | 2009516341 A | 4/2009 |
| JP | 2009140835 A | 6/2009 |
| WO | 2007119629 A1 | 10/2007 |
| WO | 2008155295 A1 | 12/2008 |
| WO | 2009069345 A1 | 6/2009 |

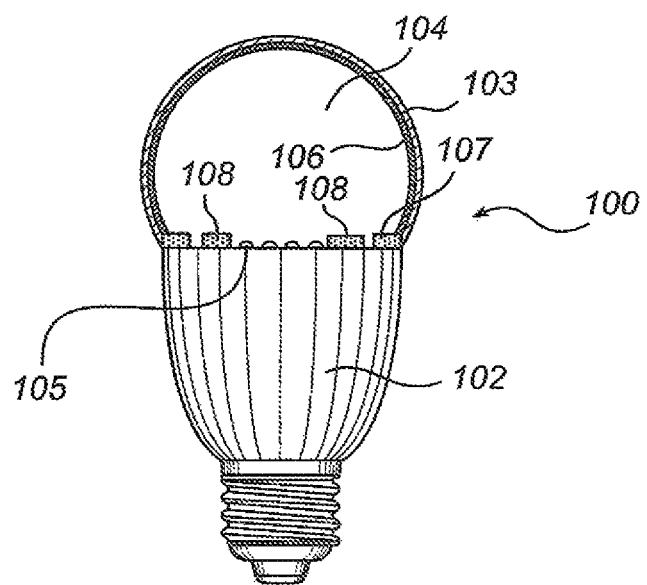

LIGHT-EMITTING ARRANGEMENT WITH ORGANIC PHOSPHOR

FIELD OF THE INVENTION

The present invention relates to a light-emitting arrangement comprising a remote wavelength converting member comprising a polymeric carrier and a phosphor.

BACKGROUND OF THE INVENTION

Light-emitting diode (LED) based illumination devices are increasingly used for a wide variety of lighting applications. LEDs offer advantages over traditional light sources, such as incandescent and fluorescent lamps, including long lifetime, high lumen efficacy, low operating voltage and fast modulation of lumen output.

Efficient high-power LEDs are often based on blue light emitting materials. To produce an LED based illumination device having a desired color (e.g., white) output, a suitable wavelength converting material, commonly known as a phosphor, may be used which converts part of the light emitted by the LED into light of longer wavelengths so as to produce a combination of light having desired spectral characteristics. The wavelength converting material may be applied directly on the LED die, or it may be arranged at a certain distance from the phosphor (so-called remote configuration).

Many inorganic materials have been used as phosphor materials for converting blue light emitted by the LED into light of longer wavelengths. However, inorganic phosphors suffer from the disadvantages that they are relatively expensive. Furthermore, inorganic phosphors are light scattering particles, thus always reflecting a part of the incoming light, which leads to loss of efficiency in a device. Furthermore, inorganic LED phosphors have limited quantum efficiency and a relatively broad emission spectrum, in particular for the red emitting LED phosphors, which leads to additional efficiency losses.

Currently, organic phosphor materials are being considered for replacing inorganic phosphor in LEDs where conversion of blue light to green to red light is desirable, for example for achieving white light output. Organic phosphors have the advantage that their luminescence spectrum can be easily adjusted with respect to position and band width. Organic phosphor materials also often have a high degree of transparency, which is advantageous since the efficiency of the lighting system is improved compared to systems using more light-absorbing and/or reflecting phosphor materials. Furthermore, organic phosphors are much less costly than inorganic phosphors. However, since organic phosphors are sensitive to the heat generated during electroluminescence activity of the LED, organic phosphors are primarily used in remote configuration devices.

The main drawback hampering the application of organic phosphor materials in remote phosphor LED based lighting systems is their poor photo-chemical stability. Organic phosphors have been observed to degrade quickly when illuminated with blue light in the presence of air.

US2007/0273274 (Horiuchi et al.) discloses a translucent laminate sheet comprising a light-emitting device and comprising an organic phosphor arranged in an airproofed cavity. The cavity is filled with the organic phosphor in a state where the concentration of oxygen is kept at 100 ppm and preferably at 20 ppm or less in a vacuum or ambient atmosphere of inert gas, to avoid deterioration of the phosphor. However, performing this operation under such low concentrations of oxygen is difficult and costly.

Hence, there remains a need in the art for improved light-emitting devices employing organic phosphor materials.

SUMMARY OF THE INVENTION

It is an object of the present invention to overcome this problem, and to provide a light-emitting arrangement employing a phosphor which has increased lifetime.

According to a first aspect of the invention, this and other objects are achieved by a light-emitting arrangement comprising a light source, typically comprising at least one LED, adapted to emit light of a first wavelength, and a wavelength converting member arranged to receive light of said first wavelength and adapted to convert at least part of the light of said first wavelength to light of a second wavelength, said wavelength converting member comprising i) a carrier polymeric material comprising a polyester comprising an aromatic moiety incorporated in the polymer backbone, and ii) at least one wavelength converting material having the following general formula I:

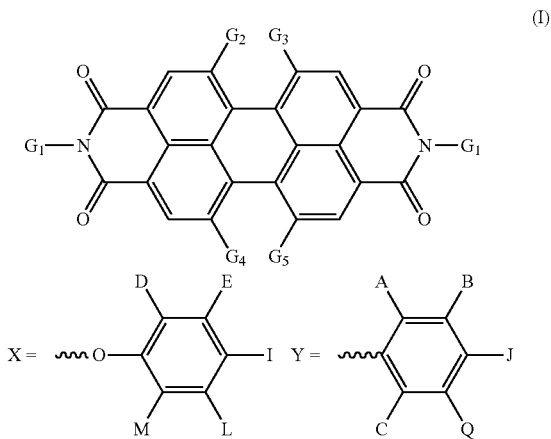

in which $G_1$ is a linear or branched alkyl group or oxygen-containing alkyl group $C_nH_{2n+1}O_m$, n being an integer from 1 to 44 and m<n/2, or Y;

each of A, B, C, J and Q independently is hydrogen, isopropyl, t-butyl, fluorine, methoxy, or unsubstituted saturated alkyl $C_nH_{2n+1}$, n being an integer from 1 to 16; each of $G_2$, $G_3$, $G_4$ and $G_5$ independently is hydrogen, fluorine, methoxy, or unsubstituted saturated alkyl group $C_nH_{2n+1}$, n being an integer from 1 to 16, or X; and each of D, E, I, L and M independently is hydrogen, fluorine, methoxy, or unsubstituted saturated alkyl group $C_nH_{2n+1}$, n being an integer from 1 to 16.

The inventors surprisingly found that a wavelength converting material having the above general formula exhibited excellent stability and hence improved lifetime when incorporated in said polyester matrix. In particular, a wavelength converting compound according to the general formula in which $G_1$ is Y was found to be advantageous in combination with said polyester matrix. Even more advantageously $G_1$ is Y, each of A and C is isopropyl, each of B, J and Q is hydrogen, each of $G_2$, $G_3$, $G_4$ and $G_5$ is X and each of D, E, I, L and M is hydrogen.

In embodiments of the invention, the polymeric material comprises a polyester homopolymer having repeating units of the general formula II:

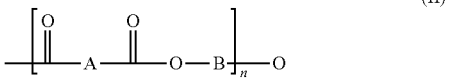

(II)

wherein A is selected from the following moieties:

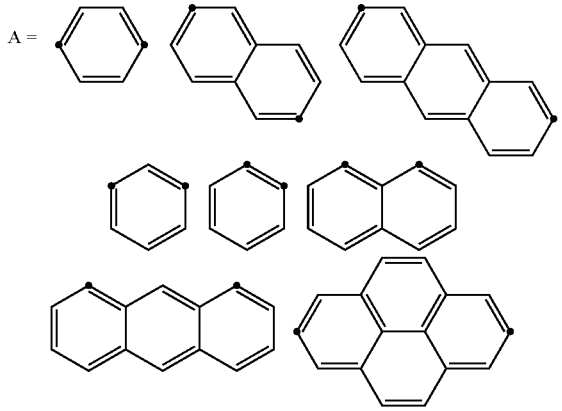

and wherein B is selected from the following two moieties:

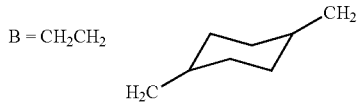

Alternatively, the polymeric material may comprise a polyester copolymer comprising various repeating units comprising any combination of said moieties at positions A and B. In particular, such a polyester copolymer may comprise first repeating units comprising any combination of said moieties at positions A and B, and comprising second repeating units comprising another combination of said moieties at positions A and B. That is, the copolymer may comprise first repeating units in which A is one of the above A moieties, and B is one of the two B moieties. The second repeating units may differ from the first repeating units either with respect to position A or with respect to position B, or both.

In embodiments of the invention, the polymeric material may be made from one or more aromatic dicarboxylic acids, and may comprise polyethylene terephthalate and/or a copolymer thereof and/or polyethylene naphthalate and/or a copolymer thereof. In particular, the polymeric material may comprise polyethylene terephthalate (PET) or polyethylene naphthalate (PEN), or a copolymer thereof derived from 1,4-cyclohexanedimethanol.

In embodiments of the invention the wavelength converting material is dispersed in the carrier polymeric material. The polymeric material may form a film, which may contain the wavelength converting material dispersed therein. The content of said wavelength converting material in the wavelength converting member may be 1% or less by weight, for example 0.1% or less by weight, such as 0.01% or less by weight.

In embodiments of the invention the wavelength converting member comprises a second wavelength converting material adapted to convert light emitted by the light source to light of a third wavelength. Thus, using more than one wavelength converting material, the spectral composition of the output light can be more conveniently adapted as desired. The second wavelength converting material may be inorganic or organic.

In embodiments of the invention the light source and the wavelength converting member are arranged mutually spaced apart, that is in so-called remote configuration. Hence, the phosphor is less exposed to the high operating temperature of an LED, and the degradation rate of the phosphor material is reduced compared to a situation where the phosphor is arranged closer or directly adjacent to the light source.

In embodiments of the invention the wavelength converting member is contained within a sealed cavity of the light-emitting arrangement having an oxygen concentration in the range of 3% or less, preferably 0.6% or less, and more preferably 0.1% or less, based on the total volume within the sealed cavity. The present inventors have found that the wavelength converting member of the present invention, comprising the polymeric material and the wavelength converting material described above shows particularly good stability when kept under an atmosphere containing a low oxygen content.

Optionally, the sealed cavity may further comprise a getter adapted to remove oxygen from the atmosphere within said cavity. Thus, a low oxygen content within the sealed cavity may be obtained without sealing the cavity under the same low oxygen atmosphere, or release of oxygen gas within the sealed cavity from components or materials within the cavity may be acceptable. In embodiments of the invention, and in particular where the cavity also contains a getter, the cavity is sealed by a seal which is non-hermetic, i.e. permeable to gas such as oxygen.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

FIG. 1 shows a side view of an exemplary embodiment of the invention.

DETAILED DESCRIPTION

The present inventors have found that certain perylene derivatives have unexpectedly long lifetime when exposed to conditions which cause quick degradation of other organic phosphor compounds. In particular, the inventors found that when the perylene derivatives were contained in a PET matrix, such as a film, the phosphor showed surprisingly good stability both in air and under semi-anaerobic conditions when illuminated with blue light.

In addition, it has been found that the phosphor material degradation is slower when the phosphor is applied remote instead of integrated with the LED element, because of inter alia the lower temperature.

FIG. 1 shows an LED based light-emitting arrangement according to an embodiment of the invention. The light-emitting arrangement of this embodiment is provided as a retrofit lamp 100. The phrase retrofit lamp is well known to the person skilled in the art and refers to an LED based lamp having an outer appearance of an older type of lamp which did not have an LED. The lamp 100 comprises a base part 102, which is provided with a traditional cap 102, such as an Edison screw cap or a bayonet cap. Further, the lamp 100 has a bulb shaped light outlet member 103 enclosing a cavity 104. A plurality of LEDs 105 are arranged on the base part 102 within the cavity 104. A wavelength converting member 106 is arranged on the inside of the light outlet member 103, i.e. on the side of the light outlet member facing the cavity 104.

The wavelength converting member may be applied as a coating on the light outlet member. It is also contemplated that the wavelength converting member may be a self-supporting layer, such as a film or sheet standing free from the light outlet member and having any suitable shape. Alternatively, it may be shaped as a hood member covering the LEDs at a certain distance from the LEDs and from the light outlet member.

The wavelength converting member comprises a matrix or carrier for the wavelength converting material. The matrix or carrier material is formed of polymeric material and is typically light transmissive, such that light emitted by the LEDs and/or converted by the wavelength converting material may be transmitted through the matrix material to the light outlet member.

The matrix or carrier polymer material comprises a polyester comprising the repeating units, at least some of which may be derived from one or more aromatic diacids. Typically an aromatic moiety forms part of the polymer backbone.

For example, the polymeric matrix may comprise a polymer having a backbone comprising n repeating units of the following general formula II:

$$\left[\begin{matrix} O & O \\ \| & \| \\ C-A-C-O-B \end{matrix}\right]_n -O$$ (II)

wherein for at least some of the repeating units of the polymer backbone A is an aromatic moiety selected from the following aromatic moieties:

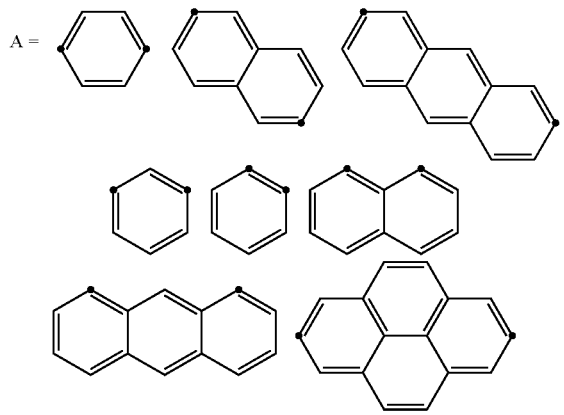

The moiety B of one or more of the above repeating units may comprise a cyclic hydrocarbon moiety such as a cyclohexane moiety. For example, the —$(CH_2)_2$— moiety of the above repeating units of the polymer backbone may be replaced with a cyclic hydrocarbon moiety, such as a 1,4-dimethylenecyclohexane moiety. In particular, B may be selected from the following two moieties:

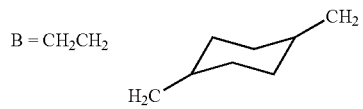

In particular, the polymer material may be polyethylene terephthalate (PET), wherein position A of formula II corresponds to 1,4 phenylene and position B of formula II corresponds to ethylene; polyethylene naphthalate (PEN) (wherein position A of formula II corresponds to naphthalene and position B of formula II corresponds to ethylene), and their copolymers. PET can be produced by an esterification reaction between ethylene glycol and terephthalic acid.

Hence, the matrix material may comprise one or more polymers selected from the group consisting of: polyesters made from ethylene glycol and at least one aromatic diacid, copolyesters made from a mixture of ethylene glycol and 1,4-cyclohexanedimethanol and aromatic diacids, copolyesters made from ethylene glycol and a mixture of aromatic diacids and copolyesters made from a mixture of ethylene glycol and 1,4-cyclohexanedimethanol and a mixture of aromatic diacids.

The wavelength converting material of the present invention may be dispersed in the matrix material. The wavelength converting material of the invention comprises at least one compound selected from the group comprising compounds of the general formula I:

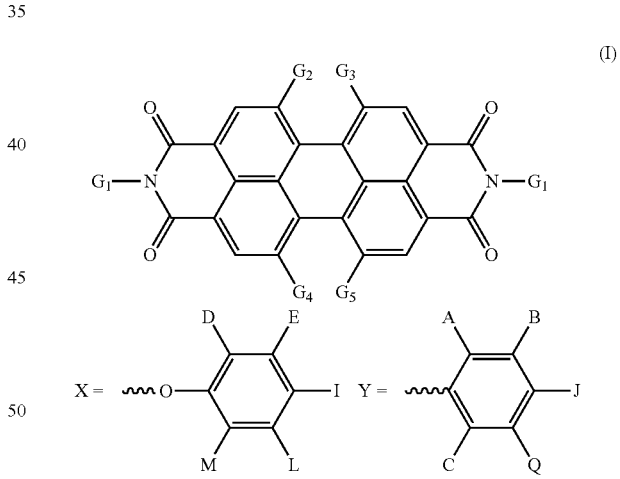

in which $G_1$ is a linear or branched alkyl group or oxygen-containing alkyl group $C_nH_{2n+1}O_m$, n being an integer from 1 to 44 and $m \leq n/2$, or Y;

each of A, B, C, J and Q independently is hydrogen, isopropyl, t-butyl, fluorine, methoxy, or unsubstituted saturated alkyl $C_nH_{2n+1}$, n being an integer from 1 to 16;

each of $G_2$, $G_3$, $G_4$ and $G_5$ independently is hydrogen, fluorine, methoxy, or unsubstituted saturated alkyl group $C_nH_{2n+1}$, n being an integer from 1 to 16, or X; and each of D, E, I, L and M independently is hydrogen, fluorine, methoxy, or unsubstituted saturated alkyl group $C_nH_{2n+1}$, n being an integer from 1 to 16.

Typically $G_2$, $G_3$, $G_4$ and $G_5$ may be hydrogen or X, and at least one of D, E, I, L and M may be hydrogen. For example, at least two of D, E, I, L and M may be hydrogen.

These wavelength converting compounds have been found to have particularly good stability in a PET matrix. Typically, at least one of J and Q may be hydrogen.

Typically, the wavelength converting material is dispersed in the matrix material. The concentration of the wavelength converting material may be 1% or less, preferably 0.1% or less, and more preferably 0.01% or less by weight, based on the total weight of the matrix material and the wavelength converting material.

When the carrier polymeric material is in the form of a film having the wavelength converting material dispersed therein, the thickness of the film may be in the range of from 10 micrometer to 2 mm. Also an injection molded form is possible.

In addition to the wavelength converting material described above, the wavelength converting member may optionally comprise a second wavelength converting material adapted to convert light of the first wavelength to light of a third wavelength. The second wavelength converting material may be an inorganic phosphor material or an organic phosphor material, for example a perylene derivative. The second wavelength converting material may also comprise a compound having the same general formula as the first wavelength converting compound, but having a different substituent in one or more of the positions $G_1$, $G_2$, $G_3$, $G_4$, $G_5$, A, B, C, D, E, I, M, L, J and Q.

The atmosphere within the cavity 104 may be air, or it may be controlled so as to have a certain composition. For example, the cavity 104 may be filled with an inert gas such as nitrogen or a noble gas e.g. argon. In embodiments of the invention, the oxygen concentration within the cavity 104 may be kept at a low level, e.g. at 20% or less, at 15% or less, at 10% or less, at 5% or less, at 3% or less, 1% or less, 0.6% or less, and preferably at 0.1% or less, by total volume of the sealed cavity.

In embodiments of the invention, the light output member 103 may be sealed so as hermetically seal the cavity 104 containing the wavelength converting member 106. A hermetic seal 107 may be provided to seal the cavity. The sealing of the cavity may be performed using methods and conditions which reduce the content of degrading gas, such as oxygen, within the cavity. Such methods and conditions are known to person skilled in the art and include vacuum pumping and filling the cavity with an inert gas; flushing the cavity with an inert gas; or sealing the cavity in an oxygen-free environment such as a glovebox. Thus, the atmosphere within cavity 104 may have a reduced oxygen content compared to normal air.

Alternatively, in embodiments of the invention, the cavity 104 is not hermetically sealed. For example, the seal 107 may be permeable such as to allow a low rate of gas (e.g. oxygen) permeation into the cavity 104. A permeable seal is typically an organic adhesive, such as an epoxy adhesive.

Furthermore, in embodiments of the invention, the cavity 104 may optionally contain a getter 108 adapted to remove gas, in particular oxygen, from the atmosphere within the cavity 104. Advantageously, by using a getter the oxygen content within the cavity 104 may be controlled without having a hermetic seal, instead using a seal which is gas permeable. However, it may be advantageous to use a getter also in combination with a hermetic seal; one advantage being that the sealing does not have to be effected under oxygen free conditions, since the getter then will absorb at least some of the oxygen trapped within the cavity 104.

The advantages of the phosphor compounds according to the present invention have been demonstrated in experiments.

Example 1

The stability (lifetime) of different organic phosphor compounds was tested under different conditions. The compound used were as follows:

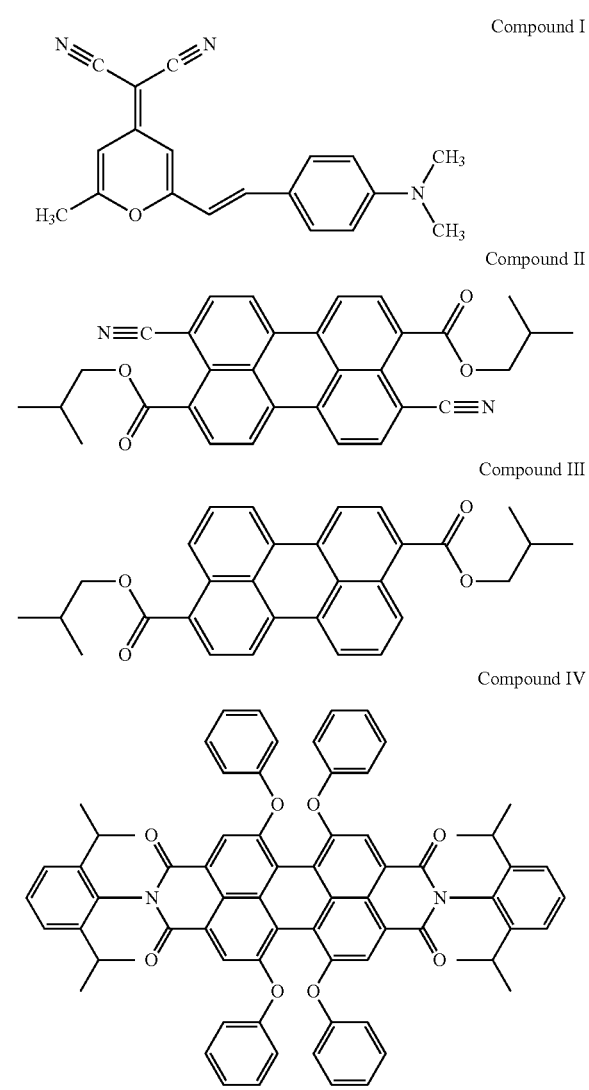

Compound I

Compound II

Compound III

Compound IV

Compound IV is available from BASF as dye F-300 or F-305 and corresponds to the general formula I in which G1 is Y and each of $G_2$, $G_3$, $G_4$ and $G_5$ is X and each of A and C is isopropyl, each of B, J and Q is hydrogen and each of D, E, I, L and M is hydrogen.

Each compound was incorporated in two different polymeric matrices, formed into layers, and placed in air or in a controlled atmosphere containing 0.1% oxygen in nitrogen. The matrices containing the phosphor materials were illuminated with blue light of 450 nm at a light flux density of 4.1 W/cm$^2$ and at a temperature of 60° C., and the luminescence intensity was measured as a function of irradiation time. The phosphor concentration and the layer thickness were chosen such that the transmission of blue light was 90% at t=0 seconds of irradiation. The lifetime of the phosphor was defined as a 10% reduction in the luminescence intensity. The resulting lifetimes are presented in Table 1.

TABLE 1

| Matrix material; atmosphere | Compound I | Compound II | Compound III | Compound IV |
|---|---|---|---|---|
| PMMA; air | Seconds | 10 minutes | 3 minutes | 40 hours |
| PMMA; 0.1% oxygen in $N_2$ | Seconds | 2 hours | 7 hours | 500 hours |
| PET; air | n.a. | minutes | minutes | 300 hours |
| PET; 0.1% oxygen in $N_2$ | n.a. | 6 hours | 5 hours | 3200 hours |

As can be seen in Table 1, compound IV showed extremely long lifetime when contained in a PET film, both in normal air and under an atmosphere having low oxygen content. The other organic phosphors tested did not show such high stability neither in air nor under reduced oxygen atmosphere.

The degradation rate of an organic phosphor depends inter alia on the light flux density, which in turn depends on the device configuration. It is noted that the light flux density of 4.2 W/cm$^2$ of this example is higher than what is commonly used in LED based lighting devices comprising organic phosphor compounds. Hence, the present example uses accelerated conditions, and it is envisaged that the wavelength converting material based on Compound IV in a PET matrix would have a lifetime of far more than 3200 h in a commercial LED based light-emitting arrangement.

The person skilled in the art realizes that the present invention by no means is limited to the preferred embodiments described above. On the contrary, many modifications and variations are possible within the scope of the appended claims. For example, it is not necessary to provide a sealed cavity as disclosed in the embodiment illustrated in FIG. 1. It is contemplated that the wavelength converting member may be contained in such a cavity, while the light source is not contained within the same cavity, but within another cavity, or alternatively, not within any such cavity at all. Also, it is possible to provide a light-emitting arrangement lacking the cavity 104. In such embodiments, the wavelength converting member may be arranged in direct or indirect contact with the light source, e.g. separated from the light source by a light guide.

The invention claimed is:

1. A light-emitting arrangement comprising a light source adapted to emit light of a first wavelength, and a wavelength converting member arranged to receive light of said first wavelength and adapted to convert at least part of the light of said first wavelength to light of a second wavelength, said wavelength converting member comprising i) a carrier polymeric material comprising a polyester comprising an aromatic moiety incorporated into the polymer backbone, and ii) at least one wavelength converting material having the following general formula I:

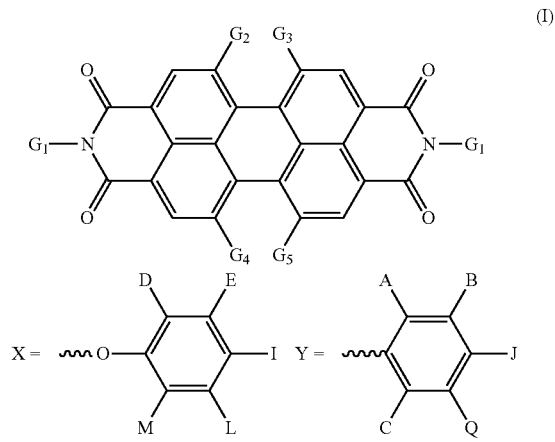

in which
G$_1$ is a linear or branched oxygen-containing alkyl group C$_n$H$_{2n+1}$O$_m$, n being an integer from 1 to 44 and m<n/2, or Y;
each of A, B, C, J and Q independently is hydrogen, isopropyl, t-butyl, fluorine, methoxy, or unsubstituted saturated alkyl C$_n$H$_{2n+1}$, n being an integer from 1 to 16;
each of G$_2$, G$_3$, G$_4$ and G$_5$ independently is hydrogen, fluorine, methoxy, or unsubstituted saturated alkyl group C$_n$H$_{2n+1}$, n being an integer from 1 to 16, or X;
and each of D, E, I, L and M independently is hydrogen, fluorine, methoxy, or unsubstituted saturated alkyl group C$_n$H$_{2n+1}$, n being an integer from 1 to 16;
wherein at least one of A, B, C, J and Q is not hydrogen.

2. A light-emitting arrangement according to claim 1, wherein the wavelength converting member comprises a second wavelength converting material adapted to convert light emitted by the light source to light of a third wavelength.

3. A light-emitting arrangement according to claim 2, wherein said second wavelength converting material is an inorganic phosphor material.

4. A light-emitting arrangement according to claim 2, wherein said second wavelength converting material is an organic phosphor material.

5. A light-emitting arrangement according to claim 1, wherein the light source and the wavelength converting member are arranged mutually spaced apart.

6. A light emitting arrangement according to claim 1, wherein the wavelength converting member is contained within a sealed cavity having an oxygen concentration in the range of 3% or less based on the total volume within the sealed cavity.

* * * * *